Figure 1:
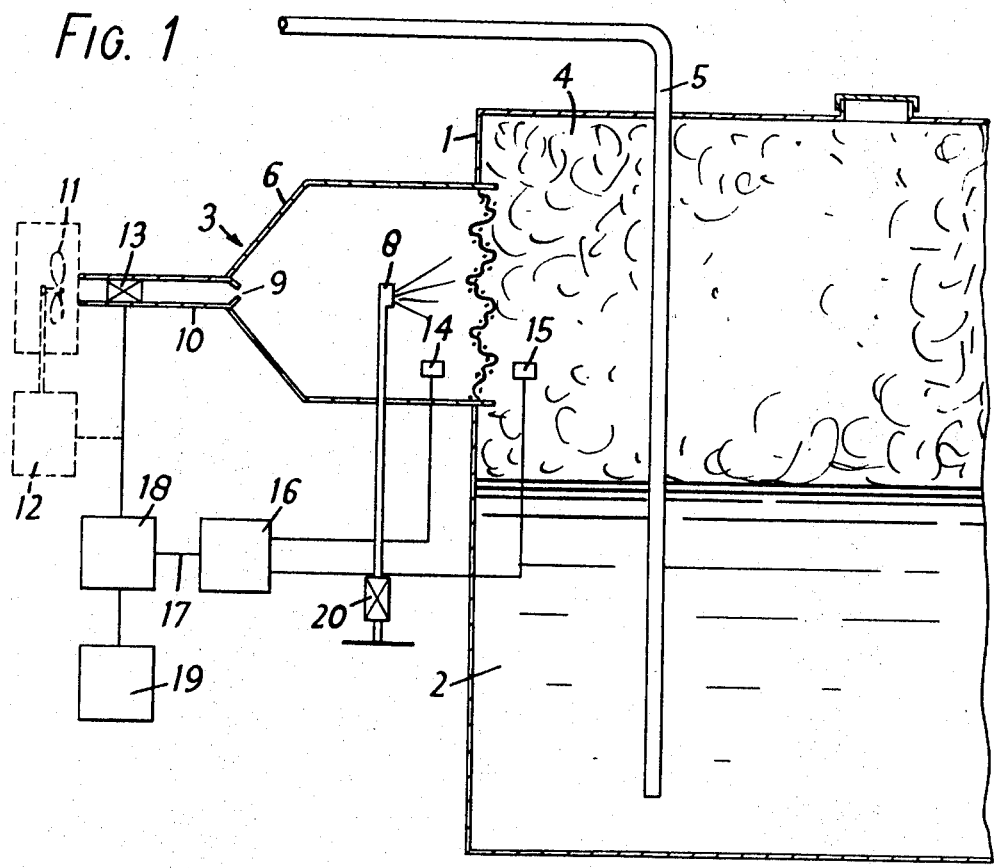

United States Patent

[11] 3,530,866

| [72] | Inventors | Denis Shepherd<br>South Harrow;<br>Alexander R. Spidy, Pulborough, England |
|---|---|---|
| [21] | Appl. No. | 790,964 |
| [22] | Filed | Jan. 14, 1969 |
| [45] | Patented | Sept. 29, 1970 |
| [73] | Assignee | Walter Kidde & Company, Inc.,<br>Belleville, New Jersey<br>a corporation of New York |

[54] EXPULSION OF FLUIDS FROM CONTAINERS
10 Claims, 2 Drawing Figs.

[52] U.S. Cl. .................................................. 137/2,
137/209

[51] Int. Cl. .................................................. B67d 5/54
[50] Field of Search.............................................. 137/1, 2,
14, 209, 210; 119/9; 220/88

[56] References Cited
UNITED STATES PATENTS

| 2,202,176 | 5/1940 | Timpson...................... | 169/4X |
| 2,898,969 | 6/1961 | Gascoin....................... | 137/209X |

Primary Examiner—Alan Cohan
Attorney—Ernest A. Joerren

ABSTRACT: Method and means for ejecting fluid, particularly oil, from a container by laying a blanket of high-expansion foam on the fluid and pressurizing the space above the blanket to eject the fluid from an outlet. The pressure may be applied by more high expansion foam or by gas.

Patented Sept. 29, 1970 3,530,866

EXPULSION OF FLUIDS FROM CONTAINERS

The invention relates to the expulsion of fluids from containers and finds particular application in use with inflammable fluids. For example it is possible to use the invention to empty the tanks of a seagoing oil tanker in the event of a fire risk.

According to one aspect of the invention there is provided equipment comprising a container for holding fluid, an outlet from the container, an inlet to the container, and a high expansion foam generator coupled to the inlet to inject high expansion foam into the container, pressurizing means being provided to pressurize the high expansion foam and thereby eject fluid from the container. The high expansion foam generator comprizes means for generating and/or mixing a stream of air or gas with a solution of foaming agent, thereby producing high expansion foam.

Preferably the inlet is at or near the top of the container and the outlet is at the bottom of the container, perhaps being the mouth of an outlet pipe which leads out through the top of the container.

The pressurizing means may comprise pressure source such as a fan or a source of pressurized gas such as carbon dioxide coupled to a second inlet and arranged to apply pressure once a blanket of high expansion foam has been generated. Alternatively, however, the pressuring means may comprise said high expansion foam generator, the initial blanket of foam being pressurized either by *a* further foam injected under pressure or *b* air or gas flow from the foam generator to which the supply of foaming agent has been shut off.

Preferably the high expansion foam generator includes two pressure sensors, one upstream of a mesh on which the foam is generated and the other downstream of the mesh, and control means responsive to the outputs from the pressure sensors and effective to control the foam generator so that a substantially constant pressure differential is maintained across the mesh. Such an arrangement allows the efficient generation of foam despite varying back-pressure in the container.

It will be seen that the invention provides a method of expelling fluid from a container including the steps of injecting into the container through a container inlet a blanket of high expansion foam from a high expansion foam generator and applying pressure to the blanket of foam, thereby forcing fluid in the container through a container outlet. In order to exercise the method it is not necessary for the high expansion foam generator to be fixed permanently to a container. For example, a foam generator may be used to empty a series of tanks in turn by being transferred from one to the next.

Figure 2:
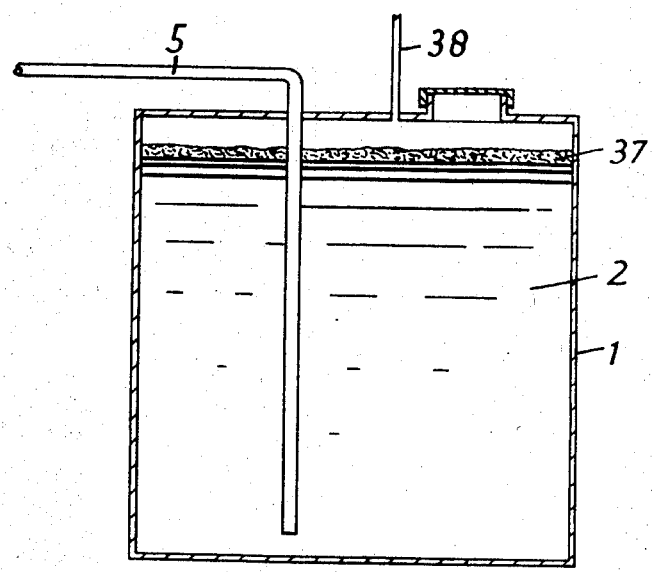

The invention will further be described with reference to the accompanying drawing, of which:

FIG. 1 is a diagram illustrating an embodiment of the invention used to discharge oil from a tanker; and FIG. 2 is a diagram illustrating another embodiment of the invention used to discharge oil from a tanker.

Referring to FIG. 1 there is shown a tank 1 in the tanker which holds oil 2. A high expansion foam generator 3 is sealed into the side of the tank near the top. In order to discharge the oil in an emergency the foam generator is activated to discharge foam 4 under pressure into the space above the oil and thereby eject the oil through a pipe 5 which has an inlet at the bottom of the tank and an outlet above the level of the tank. Thus, as the level of the oil in the tank falls the back-pressure required in foam 4 to eject the oil rises.

The foam generator comprises an expansion chamber 6 over the exit of which is arranged a mesh or net 7. A spray head 8 sprays a solution of a foaming agent in water on to the net. Air under pressure is ejected into chamber 6 from a nozzle 9 at the end of a conduit 10. The air may be derived from a fan 11 shown schematically in broken line as being driven by a motor 12. Conduit 10 includes throttle control means comprising an electrically operated shutter 13. This regulates the flow of air into the expansion chamber.

A pressure transducer 14 is provided upstream of the net and a similar transducer 15 is provided downstream of the net. Signals therefrom representative respectively of the pressure upstream of the net and the pressure downstream of the net are applied to the inputs of a comparator 16. An output therefrom is given on line 17 representative of the difference between the pressures. This output is compared in a second comparator 18 with a reference datum signal derived from a reference datum generator 19. Any difference between the datum signal and the output from comparator 16 is given as an error signal from the output of comparator 18 and is applied to control shutter 13.

The control arrangement is such that the error signal always tends to be reduced to zero and this means that whatever the back-pressure of foam 4, the pressure differential between transducers 14 and 15 is substantially constant, being determined by the setting of the datum generator 19. Thus, the optimum pressure differential for efficient foam generation is maintained despite large variations in back-pressure. This pressure differential may be, for example, about 2 or 3 p.s.i. and may be maintained against a back-pressure of 30 p.s.i. or so.

The production of high expansion foam will take place without causing static electricity thereby minimizing the possiblity that the oil fumes would be ignited.

The above described method of expelling oil may be regarded as providing an initial blanket of high expansion foam which covers the oil and pressurizing the initial blanket by continuing to supply foam under pressure. However, the invention is not limited to such a method. For example, there may be provided a valve 20 in the conduit leading to the spray head 8. Thus, after the initial blanket of foam has been laid down the supply of foaming agent may be shut off so that the foam generator supplies only air thereafter. Also, with this arrangement the control system which regulates the air flow may be bypassed at this time so as to apply maximum air pressure to exhaust the tank quickly.

Referring now to FIG. 2 it will be seen that if desired the high expansion foam generator can be used to form a blanket of foam 38 and pressure is applied to the blanket by compressed gas, e.g. compressed air or where available, compressed carbon dioxide supplied by a pressure conduit 37. Here the high expansion foam blanket isolates the oil fumes from any static electricity that may form by the compressed gases entering the container.

We have found that the high expansion foam blanket will not break down even under fairly high pressures applied by the compressed air or other gas.

The high expansion foam generator 14 may be fixed in position in the side of the container with suitable removable guard or cover means, such as disclosed in U. S. Pat. Specification No. 1,051,850, for protecting the mesh from the oil and preventing ingress of the oil. Alternatively, the foam may be applied through an inspection hatch 39. Where the foam alone is being used to discharge the oil, the high expansion foam generator will have to be sealed to the hold and therefore it is preferred that the high expansion foam generator should be fixed in position.

We claim:

1. Equipment comprising a container for holding fluid, an outlet from the container, an inlet to the container, and a high expansion foam generator coupled to the inlet to inject high expansion foam into the container, pressurizing means being provided to pressurize the high expansion foam and thereby eject fluid from the container.

2. Equipment as claimed in claim 1 wherein the pressurizing means comprises a pressure source coupled to a second inlet to the container.

3. Equipment as claimed in claim 1 wherein the pressurising means comprises said high expansion foam generator.

4. Equipment as claimed in claim 3 wherein means are provided for shutting off the supply of foaming agent to the foam generator while allowing air or gas therefrom to pressurize the container.

5. Equipment as claimed in claim 1 wherein the high expansion foam generator includes two pressure sensors, one upstream and a mesh on which the foam is generated and the other downstream of the mesh, and control means responsive to the outputs from the pressure sensors and effective to control the foam generator so that a substantially constant pressure differential is maintained across the mesh.

6. A method of expelling fluid from a container, the method including the steps of injecting into the container through a container inlet a blanket of high expansion foam from a high expansion foam generator and applying pressure to the blanket of foam, thereby forcing fluid in the container through a container outlet.

7. A method as claimed in claim 6 wherein said pressure is applied from a pressure source coupled to a second inlet to the container.

8. A method as claimed in claim 6 wherein said pressure is applied from said high expansion foam generator.

9. A method as claimed in claim 8 wherein said pressure is applied by injecting further high expansion foam under pressure.

10. A method as claimed in claim 8 wherein the high expansion foam generator comprises a mesh through which air or gas is blown and onto which is deposited a foaming agent solution, the method including the steps of measuring the pressure upstream and downstream of the mesh and maintaining the pressure drop across the mesh substantially constant.